3,582,468
RECOVERY OF DOUBLE-STRANDED RIBONUCLEIC ACID
Jerome Birnbaum, Morganville, N.J., and George P. Lampson, Hatfield, Pa., assignors to Merck & Co., Inc., Rahway, N.J.
No Drawing. Filed Sept. 27, 1968, Ser. No. 763,399
Int. Cl. C12b 1/00
U.S. Cl. 195—28                                                   6 Claims

ABSTRACT OF THE DISCLOSURE

Double-stranded ribonucleic acids (DS–RNA) are recovered from a fermentation broth which involves adding a proteolytic enzyme, which will not attack nucleic acid, to destroy the interface formed by subsequent phenol extraction. Also, a quaternary ammonium compound including a cetyl radical is used to precipitate the DS–RNA. Additionally, purification is achieved by chromatography using hydroxylapatite.

RELATED CASES

Ser. No. 659,308 filed by G. P. Lampson, et al. on Aug. 9, 1967, now abandoned, Ser. No. 744,687 filed by B. D. Lago on July 15, 1968.

PRIOR ART

Inducers of Interferon and Host Resistance, IV. Double-stranded replicative form RNA (MS2–RF–RNA) from *E. coli* infected with MS2 coliphage.

SUMMARY OF THE INVENTION

This invention relates to the production of interferon inducers and particularly to a process for the isolation and recovery of double-stranded ribonucleic acid produced by *Escherichia coli* (*E. coli*) cells infected with MS2 coliphage or other MS2 related phages such as the MU–9 mutant.

The fact that double-stranded ribonucleic acid may come from this source is stated in an article entitled, Inducers of Interferon and Host Resistance, IV. Double-stranded Replicative Form RNA (MS2–RF–RNA) from *E. coli* infected with MS2 coliphage, by A. K. Field, G. P. Lampson, A. A. Tytell, M. M. Nemes, and M. R. Hilleman, appearing in the Proceedings of the National Academy of Sciences (U.S.), vol. 58, No. 5, pp. 2102–2108, (November, 1967). In that article it is reported that MS2 coliphage when grown in cells of *E. coli* produces a double-stranded RNA during its cycle of replication. This double-stranded RNA after isolation and purification proves to be an excellent inducer of interferon when administered to animals.

That journal article describes the manner of *E. coli* culture, its infection with MS2 coliphage, the lysing of the cells, repeated extractions with phenol to remove protein, treatment with pancreatic ribonuclease to digest single-stranded ribonucleic acid, treatment with deoxyribonuclease to degrade cellular deoxyribonucleic acid, subsequent treatment with bentonite (e.g. Macaloid) or a like ribonuclease inhibitor, and use of gel filtration (e.g. Sephadex G200) to recover the double-stranded ribonucleic acid in a purified form. Further purification as there described, is achieved by chromatography of the high molecular weight material (eluted in the void volume fraction from the gel filtration) on a column of cellulose which has previously been treated with triethanol and epichlorohydrin (e.g. Ecteola cellulose). The cellulose aided in the partial removal of contaminating polysaccharide material and permitted also recovery of the double-stranded ribonucleic acid (hereinafter called DS–RNA) in a more concentrated state. The prior purification or isolation procedure is also disclosed in the following additional references: Weissman, C., P. Borst, R. H. Bardon, M. A. Billeter and S. Ochoa, Proc. Nucleic Acid Research, 51, 682 (1964); Billeter, M. A., C. Weissman, and R. C. Warner, J. Mole. Biol. 17, 145 (1966); Billeter, M. A. and C. Weissman, Proc. Nucleic Acid Research, Harper and Row, New York, 1966.

The isolation procedure described in their journal articles is satisfactory for fermentation broths with relatively dilute cell concentrations there being handled. However, a fermentation broth containing considerably more cell growth and which consequently is quite concentrated in character does not lend itself to the purification process of the journal article. For example, recent advances in this art made by Dr. Barbara Lago have shown that growth of the *E. coli* in a corn steep liquor medium and infection with the MU–9 mutant of MS2 coliphage, produces an increase of up to ten times and even more as much cell growth and a correspondingly greater amount of DS–RNA. Under these circumstances the fermentation broth becomes so dense that the former isolation procedure becomes inadequate, uneconomical, and difficult to perform.

The reason for the inapplicability of the former process to a fermentation broth containing large amounts of bacteria appears to be in the formation of a heavy viscous interface of denatured protein during the first phenol extraction which removes protein. This interface makes it extremely difficult to separate the aqueous phase (containing nucleic acid) from the phenol phase. Further, much of the nucleic acid, including DS–RNA, becomes trapped within the interfacial material. Washing of the interface, as suggested by the original procedures, only partially releases the trapped nucleic acid. Furthermore, the difficulty in separating the aqueous and phenol phases necessitates the use of seven phenol extractions in the isolation protocol. As a result, many alcohol precipitations and concomitant centrifugations are required to aid in the removal of the phenol from the nucleic acid solutions.

Thus, reduction or elimination of the interfacial material is a distinct improvement in the isolation. In accordance with the present invention this is accomplished by adding Pronase or like proteinase, to the cell slurry during lysis of the cells by sodium dodecyl sulfate. The Pronase is added to give a 0.25 to 1.0 mg./ml. of slurry and a 0.50 mg./ml. slurry is preferred. Less or more active proteinases which are substituted will require a proportionate change in the mg./ml. concentration.

Pronase, a proteolytic enzyme extracted from *Streptomyces griseus*, is representative of highly active non-specific proteolytic enzymes which do not degrade nucleic acid. The Pronase treatment degrades the protein in the lysate completely, and thereby eliminates the interface during the first phenol extraction. So great is the reduction of the interface that all but one phenol extraction can be omitted. This in turn eliminates the need for two alcohol precipitations and reduces the number of centrifugations. The advantages of the Pronase procedure are as follows:

(1) Elimination of the protein in the interface during phenol extraction allowing easy recovery of the aqueous phase containing the DS–RNA; (2) Increase in final isolated yield of DS–RNA; (3) Reduction in the cost of the isolation by eliminating 6 of 7 phenolizations, reducing the number of alcohol precipitations and centrifugations; (4) Elimination of any possible degradative effects of *E. coli* ribonucleases on DS–RNA. Enzymes capable of degrading native DS–RNA have been found in *E. coli*. Pronase treatment would destroy this activity (see Robertson et al., J. Biol. Chem. 243, 82–91, 1968); (5) Elimination of the use of ribonuclease inhibitors such as Macaloid, etc.; (6) Facilitation of the handling of concentrated cell pastes in small extraction volumes.

The second feature of the present invention is the use of a quaternary ammonium compound containing a cetyl radical attached to the quadrovalent nitrogen, as a precipitation agent for final purification and concentration of the double-stranded ribonucleic acid. This quaternary ammonium compound is used in place of column chromatography on Ecteola cellulose. The advantages of the cetyl quaternary ammonium compound procedure are as follows:

(1) It is considerably less expensive to perform because of the low cost of the quaternary ammonium compound and relatively high cost of Ecteola cellulose. (2) The number of man hours necessary to perform the quaternary ammonium treatment is considerably less than for chromatography. (3) The quaternary ammonium technique results in a dry powdered product with good chemical stability; chromatographed material is in solution and requires additional drying steps which are both time-consuming and costly. (4) The quaternary ammonium procedure removes 100% of endotoxin material (as measured by the absence of methylpentose-containing material) making the DS–RNA considerably less toxic to laboratory animals. Ecteola cellulose chromatography removes only a fraction of the contaminating lipopolysaccharide (endotoxin) from the DS–RNA preparation after Sephadex chromatography. Such a DS–RNA preparation is toxic to animals when injected at high doses. (5) Prior to Ecteola chromatography, a dialysis step is necessary. With the quaternary ammonium compound the dialysis step is unnecessary.

A preferred cetyl quaternary ammonium compound is cetyltrimethylammonium bromide (hereinafter called CTAB), but instead of trimethyl the three radicals may be chosen from ethyl, propyl, butyl and benzyl and the cation may be chlorine instead of bromine. For example it may be cetyldiethylbenzylammonium chloride.

The amount of the quaternary ammonium compound to be added is determined by the amount of DS–RNA present and this is most easily ascertained by the optical density (O.D.) of the slurry to which it is added. To do this monochromic light of 260 m$\mu$ is projected through a standard optical density apparatus and for every measured 21 O.D. units is added from 0.05 to 0.2 ml. (preferably 0.1 ml. of aqueous 2% cetyltrimethylammonium bromide. For other concentrations a corresponding adjustment in the amount added is made so that the same dry weight of the CTAB is added. This applies to the equivalent CTAB compounds, mentioned above, which may be substituted.

A representative example is the following procedure for the isolation of MU–9–DS–RNA from *E. coli* 3000 infected for 3 hours in a corn steep liquor medium.

EXAMPLE I (1) Cells from 1 liter of broth (about 3 g. dry weight) are suspended in 36 ml. of 0.02 M Tris, pH 7.8, 0.001 M ethylenediaminetetraacetic acid (EDTA). After a homogeneous slurry of cells is obtained, 4 ml. of 10% sodium lauryl (dodecyl) sulfate are added with vigorous stirring. Pronase (solid) is added to give 0.5 mg./ml. and the mixture is incubated at 37° C. for at least 7 hours.

(2) 40 ml. of phenol (equilibrated with 0.05 M Tris—0.005 M EDTA pH 8 before use) are added and shaken vigorously. Centrifugation at a speed sufficient to break the emulsion is performed and the aqueous phase is separated and placed in a clean vessel. The aqueous phase is a milky viscous slurry at this point.

(3) 2 volumes of cold 95% ethanol are added with vigorous agitation, it is then shaken well, and then is stored at −20° C. for at least 2 hours. Centrifugation at a speed to cause separation is performed and the supernatant fluid is discarded.

(4) The precipitate which contains the DS–RNA is suspended in 50 ml of 0.05 M Tris, 0.005 M EDTA pH 8.0. As the alcohol solids may not dissolve completely it should be centrifuged and the sediment (cell debris) discarded.

(5) Sufficient potassium acetate is added (from 4 M stock) to make the supernate 0.2 M and stirred for 5 min. Then 2 volumes of cold ethanol are added, the mixture shaken well and then stored for at least 2 hours at −20° C. Centrifugation at low speed is performed and the supernatant is discarded.

(6) The precipitate is suspended in 36 ml. of 0.02 M Tris—0.005 M MgCl$_2$ pH 7.2. It does not dissolve completely, but a homogeneous suspension is obtained. Then is added beef pancreas Deoxyribonuclease 1 to 20 $\mu$g./ml. and the preparation is incubated at 25° C. for 1 hour with occasional stirring.

(7) 4 ml. of 10×SSC (1×SSC=0.15 M NaCl—0.015 M Na citrate pH 7.0) are added. Then beef pancreas Ribonuclease A is added to 20 $\mu$g./ml. and the mixture is incubated for 1 hour at 37° C. with occasional stirring.

(8) The digest is centrifuged to remove all insoluble material. 2 volumes of cold ethanol are added to the clarified supernate and shaken well. This is stored at −20° C. for at least 2 hours. Centrifugation at low speed is carried on and the supernate is discarded.

(9) The precipitate is dried partially in vacuo over KOH pellets. Several hours are necessary to remove most of the alcohol.

(10) The precipitate is resuspended and dissolved in SSC. Just enough SSC is added to dissolve the precipitate. The object is to keep this volume as small as possible and still permit complete dissolution of the precipitate.

(11) The solution is applied to a column of Sephadex G200 (hydrated and equilibrated in SSC). The column is eluted with SSC and the void volume fractions are pooled.

(12) Solid NaCl is added to the pooled fractions so that it becomes 0.3 M. An optical density measurement is taken at 260 m$\mu$ and for every 21 O.D. units is added 0.1 ml. of 2% cetyltrimethylammonium bromide (CTAB). A precipitate will form immediately. It is left at room temperature for 10 min. and then centrifuged and the supernate is discarded.

(13) The precipitate is suspended in 0.3 M NaCl—0.005 M phosphate pH 7 (the same volume as the pooled void volume fractions is used). Stirring is performed for exactly 5 min., then it is recentrifuged and the supernate discarded.

(14) The precipitate is dissolved in 0.5 M NaCl—0.005 M phosphate pH 7, using 1/10 to 1/5 the volume of the original pooled void volume fractions. To it is added 3 volumes of cold ethanol and the mixture shaken well. Storage is maintained at −20° C. for 2 hours, after which it is centrifuged and the supernate discarded.

(15) The precipitate is washed once with cold 95% ethanol and then once with cold absolute ethanol.

(16) The precipitate is then dryed in a vacuum desiccator over KOH pellets.

The purified DS–RNA obtained by this improved isolation procedure is essentially identical to that obtained by the old procedure. This material shows a relative RNase resistance and a high thermal transition curve with a melting temperature ($Tm$) of 105 to 107° C. in SSC. When administered to animals in microgram quantities it elicits the formation of interferon and thereby protects the animals from virus infection.

A third feature of the invention is that if required or desired additional purification of MU–9 DS–RNA can be achieved by chromatography on hydroxylapatite powder (HTP). The procedure would be carried out on the product of Example 1 and it is as follows:

EXAMPLE II (1) Preparation of HTP column. One part of HTP is added with gentle stirring to four parts of 0.005 M phosphate buffer, pH 6.7 and allowed to swell overnight. After several decantations and resuspendings in phosphate buffer to remove fines, the HTP slurry is poured into a 3 cm. diameter column to a height of 7.5 cm. The column was washed with 4 or 5 column volumes of 0.005 M phosphate buffer.

(2) Chromatography on HTP column. 40 mg. of dried MU–9 DS–RNA were dissolved in 20 ml. of 0.005 M phosphate buffer and passed through the column followed by an equal volume of buffer. Impurities were washed from the column by passing 5 column volumes (1 column volume=50 ml.) of 0.13 M phosphate buffer, pH 6.7–6.8 through the column. The DS–RNA was eluted from the column by the addition of 2 column volumes of 0.2 M phosphate, pH 6.7–6.8.

(3) Recovery of DS–RNA from 0.2 M phosphate buffer. For every 21 O.D. units 0.1 ml. of 20. STAB was added. After standing 10–20 minutes at room temperature, the RNA-CTAB precipitate was centrifuged 20 minutes at low speed. The CTAB precipitate was washed once with distilled water and dissolved in a small volume (5–10 ml.) of 0.5 M NaCl—0.005 M phosphate, pH 7. DS–RNA was precipitated by the addition of 2 volumes of cold absolute ethanol. The precipitate was washed once with 95% ethanol, once with absolute ethanol and dried over KOH pellets in a vacuum dessicator.

It is to be understood that the conditions of Example II are not absolutely critical as a plus or minus variation on the order of about 5% from the figures therein will permit practice of the invention.

The above examples are indicative of other variations which can be made within the ranges and equivalents mentioned above. Thus, the relative amount of the pronase or its equivalent proteinase may be varied within the range stated above. In like manner, the relative amount of the quaternary ammonium compound or its equivalent cetyl radical containing compound may be varied within the range stated above.

What is claimed is:

1. The method of isolating double-stranded ribonucleic acid (DS–RNA) from a fermentation broth of *E. coli* cells which have been infected with MS2 coliphage or the MU–9 mutant of this coliphage, which includes the step of lysing the cells to release the DS–RNA, adding a proteolytic enzyme which will not degrade nucleic acid, incubating the mixture to degrade the protein, adding phenol to extract the degraded protein, and centrifuging and recovering the aqueous phase containing the DS–RNA.

2. The method according to claim 1 in which the crude DS–RNA of said aqueous phase is further separated by steps including the addition of a quaternary ammonium cetyl-radical containing compound to a crude DS–RNA containing preparation to thereby precipitate the DS–RNA, and recovering the precipitate.

3. The method of claim 1 in which said enzyme is added to give a 0.25–1.0 mg./ml. concentration.

4. The method of claim 1 in which said enzyme is added to give a 0.50 mg./ml. concentration.

5. The method of claim 2 in which the addition of the quarternary ammonium compound is the ratio of 0.05 to 0.2 ml. of a 2% aqueous solution for every 21 O.D. units measured with 260 m$\mu$ monochromic light.

6. The method of claim 2 in which further purification of DS–RNA is obtained by absorption on hydroxylapatite, elution of the impurities therefrom and subsequent elution of the DS–RNA in a purified form.

References Cited

Davidson et al., Progress In Nucleic Acid Research And Molecular Biology, vol. 6. pp. 377–381 (1967).

Field et al., National Academy of Sciences, vol. 58, No. 5, November 1967, pp. 2102–2108.

ALVIN E. TANENHOLTZ, Primary Examiner